United States Patent [19]

Weisner

[11] Patent Number: 4,706,168
[45] Date of Patent: Nov. 10, 1987

[54] SYSTEMS AND METHODS FOR ILLUMINATING OBJECTS FOR VISION SYSTEMS

[75] Inventor: Ralph M. Weisner, Canoga Park, Calif.

[73] Assignee: View Engineering, Inc., Simi Valley, Calif.

[21] Appl. No.: 798,632

[22] Filed: Nov. 15, 1985

[51] Int. Cl.<sup>4</sup> .............................................. G03B 15/02
[52] U.S. Cl. ...................................... 362/18; 362/32; 362/302
[58] Field of Search ................. 356/1, 376; 362/5, 18, 362/32, 33, 84, 216, 284, 283, 302, 303, 304, 285, 289, 419, 277

[56] References Cited

U.S. PATENT DOCUMENTS

| | | | |
|---|---|---|---|
| 4,288,844 | 9/1981 | Fisher et al. | 362/18 |
| 4,392,182 | 7/1983 | Dimatteo | 362/5 |
| 4,494,868 | 1/1985 | Lambeth | 356/1 |
| 4,529,316 | 7/1985 | Dimatteo | 356/1 |
| 4,530,036 | 7/1985 | Conti | 362/311 |
| 4,611,917 | 9/1986 | Robieux et al. | 356/376 |
| 4,617,619 | 10/1986 | Gehly | 362/302 |

Primary Examiner—Craig R. Feinberg
Assistant Examiner—David A. Okonsky
Attorney, Agent, or Firm—Bogucki, Scherlacher, Mok & Roth

[57] ABSTRACT

An illumination system, particularly suitable for use with automatic vision systems employing an image sensing device or system, illuminates an object under analysis with the cone of light that may cover 360° or only an arc segment about a part of the object under analysis. Light from a ring source is directed toward a curved parabolic surface on a light collector ring that substantially collimates the light and fans it out radially out toward a toroidal reflector surface on an encompassing ring, the relative position of which determines the angle of incidence of a cone of light formed to fall in the region of the object, so as to illuminate particular features with optimal efficiency. To change the angle of incidence while maintaining focus, a differential drive mechanism moves the parabolic collector ring and the toroidal angle generator ring in differential fashion concurrently.

18 Claims, 6 Drawing Figures

OPTICAL PATH CHANGES WITH
DIFFERENTIAL MOTION

OPTICAL PATH CHANGES WITH
DIFFERENTIAL MOTION

SYSTEMS AND METHODS FOR ILLUMINATING OBJECTS FOR VISION SYSTEMS

BACKGROUND OF THE INVENTION

The rapid growth of automatic measurement techniques for precision products, ranging from mechanical parts made to very narrow tolerances to minute VLSI semiconductor products, has led to the generation of a number of systems for automatic inspection of such parts and components. In these systems, an article to be checked or measured is imaged, generally through a high magnification optical system, on an electronic image pickup device, such as a Vidicon, CCD array, or other image-to-signal converter. The video signals can be processed, utilizing adapted software and a microprocessor or minicomputer, to analyze the image and particular parts of the image. Image transformation techniques can be used to rotate, zoom and translate the image, pattern recognition techniques can be employed to compare the image to a predetermined standard, flaws can be identified, dimensions and spacings can be measured. These functions can be performed with high reliability and freedom from error when the image is adequately defined.

The signals derived from scanning of the optical image, however, depend on the physical and optical characteristics of the object under examination. While the eye can readily perceive differences in color and texture, and the eye can also adjust for reflections and other effects and a human operator can make adjustments dependent on overall perceptions, processing of the image signal depends essentially upon the nature of the variations in the signal. Precise location of an edge of a given surface, for example, requires a high signal contrast between the surface and its background. If the diameter of an aperture is being measured, for example, abrupt variations in signal magnitude enable the vision system to give a reading of the dimension that is much more rapid, accurate and reliable than any system requiring operator judgment. Precision components, however, are three-dimensional in character and it is often desirable to inspect or measure specific attributes at different levels. If a hole is tapered, for example, and the hole is concentric with a vertical axis, the taper can be determined with accuracy by taking hole diameter readings at each end, for which purpose uniform illumination is not optimal. This illustrates the general problem of so illuminating an object under inspection that highlights and shadows can be used to best advantage in displaying the features and surfaces that are to be inspected or measured.

The vision systems of the class described herein are best exemplified by the View Engineering Model 1200, a microprocessor-based system which makes non-contact measurements in three dimensions of complex parts and to an accuracy of the order of 0.00025". In this system, object illumination may be provided by a light source disposed around the objective lens of the magnification system for the camera, or coaxially through the objective. The capability for enhancing different characteristics at different times has been limited except that limited advantages have been derived by using discretely differing light sources in particular instances.

An illumination system which can efficiently and economically provide different, controllable, illumination of an object under study is not limited to use with vision systems of the type generally described. It can also be employed in microscopy, microphotometry, and microphotography, where the part being examined is viewed under some substantial magnification and image enhancement is desirable for specific purposes.

SUMMARY OF THE INVENTION

Systems and methods in accordance with the invention employ a light source providing a hollow cylindrical sheet of diverging light together with a pair of curved ring reflectors. One of the reflectors collects and collimates the cylindrical sheet of light and directs it as a lateral fan to an adjacent reflector ring having a curved surface. The angle of deflection from the second reflector forms a cone whose angle of incidence varies in accordance with the relative position of the two rings. When moving the two reflecting rings toward or away from the object at differential rates, the cone of illuminating light continues to focus at a given point but with a varying included angle that changes the highlights, shadows and contrasts in the image through a wide range. A feature of the invention is that the focal point can be changed through a wide range. Furthermore, the ring light source generating the sheet of light is advantageously divided into separate arc segments which can be illuminated in different combinations so as to achieve further versatility in presentation of the image.

In a specific example of a system in accordance with the invention, a vision system has an optical axis along which a camera views an object through a magnification system. X, Y and Z axis positioning is provided between the camera and the item being examined. A ring light source comprising a cylindrical array of optical fibers, energizable in quadrants, is disposed concentric with the optical axis, encompassing the lens magnification system. The optical fibers in the ring light source generate individually diverging beams forming a hollow cylindrical sheet of light directed downwardly toward the object under examination. The light is reflected off a reflecting surface of parabolic cross section on the inner ring, substantially radially outwardly toward a curved reflecting surface on the second outer ring. The second reflecting surface is a toroidal segment that has a circular cross section to direct the light down to a common focal point, dependent upon the region of incidence on the second reflecting surface. A differential drive mechanism is coupled to the Z axis carriage to move the first and second reflector rings in the same direction, but at different rates of movement, such that the focal length changes along with the angle of incidence, and the focal point remains fixed. The mechanism moves separately from the focusing of the camera, so as to provide greater versatility. In this arrangement, differential motion is preferentially provided by a double rack system, with the pitch of the teeth on the racks being in a selected ratio. Drive and idler gears between opposing racks enable the two racks to be moved in the selected ratio by a single motor, and without requiring external bearings.

BRIEF DESCRIPTION OF THE DRAWINGS

A better understanding may be had by reference to the following description, taken in conjunction with the accompanying drawings, in which.

DETAILED DESCRIPTION OF THE INVENTION

Figure 1:
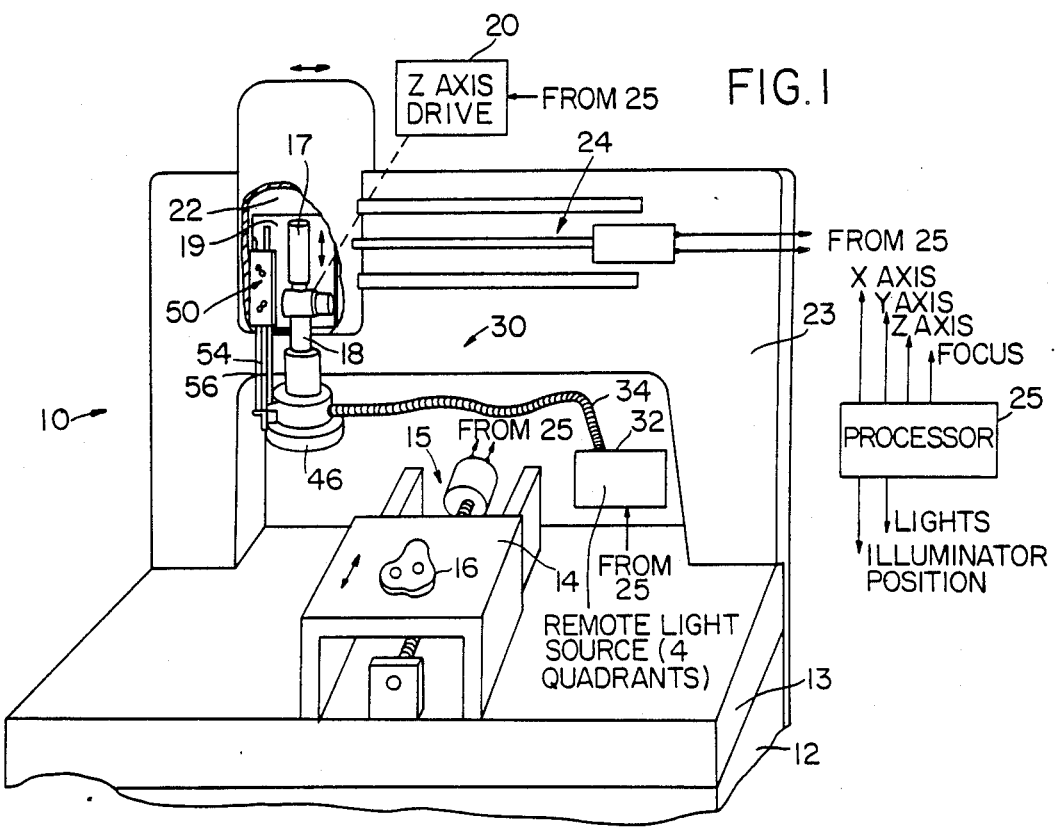
FIG. 1 is a prespective view, partially broken away, of a vision system incorporating an illumination system in accordance with the invention.
Figure 2:
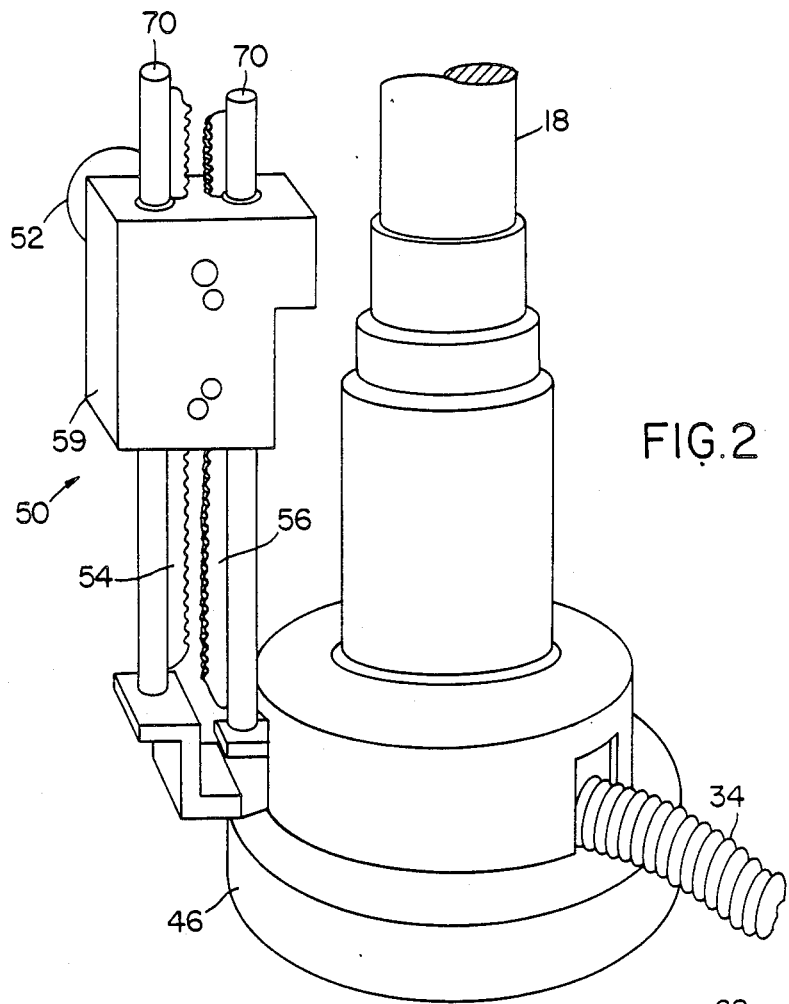
FIG. 2 is a perspective fragmentary view of a portion of the arrangement of FIG. 1.

A vision system 10 in accordance with the invention, as seen in FIGS. 1 and 2, comprises a base console 12 having a temperature stable flat granite table 13 on which a stage 14 is movable in the Y direction under control of a drive 15, comprising a motor and lead screw is mounted to place a product 16, indicated only generally, to be inspected at a given position in a viewing zone. A vertically mounted camera 17 points down at the viewing zone through a magnifying lens system 18. The camera 17 is mounted on a Z axis support 19 that is driven in the vertical direction by a Z axis motor 20 so that the camera can focus on particular regions and surfaces. The camera 17 and Z axis support 19 are stably mounted on an X axis carriage 22 that is mounted on a stable vibration free bridge 23 spanning the viewing region above the platform 14. The carriage 22 is translated in the horizontal plane by a drive 24 comprising a motor and lead screw. Both the drives 15 and 24 as well as the Z axis drive motor 20 are controlled by signals from a processor 25, which is typically programmed to position the product 16 at given X and Y axis positions relative to the camera 17 and also to focus on a particular level at the object. An illumination system 30 having elements concentric with the optical axis is mounted conjointly with the camera 17 and lens system 18 on the Z axis support 19.

The illumination system 30, referring now to FIGS. 2-5 as well as FIG. 1, includes a remote light source 32 on the console coupled through a flexible optical fiber harness 34 having many individual optical fibers to a light ring 36 that is disposed about the lower end of the lens system 18 and concentric with the optical axis. As seen in the sectional view of FIG. 3, the ends of the individual optical fibers 38 are fanned out from a parallel core into a cylindrical pattern in which the fibers are parallel and adjacent around the cylinder. The light emanating from the ends of the fibers 38 collectively generates a hollow cylinder or sheath of light directed down toward the product 16. However, the light from each fiber end diverges at an angle of about 62° in this instance, this angle varying in dependence on the precision of the end flat. The remote light source 32 has four separate sources in this example, each controlling light to a different quadrant at the illuminator 30 and each controlled by the processor 25.

Below the light ring 36, a first reflector ring 42 is movably mounted along the optical axis and includes a first reflector surface 44 which is parabolic in cross section. The focal point of the parabola is chosen relative to the angle of divergence of light from the fibers, to provide substantial collimation. Because the parabolic reflector surface 44 is in the path of the downwardly directed light cylinder, it deflects the light radially outwardly from the circumference of the reflector surface 44 to form what may be called a fan of light concentric with the optical axis of the camera 17. Thus the first reflector ring 42 acts as a light collector as well as a light path diverter because of the parabolic surface. The first reflector ring is in the form of a surface of revolution whose body includes a waist section for receiving the light ring 36.

Figure 3:
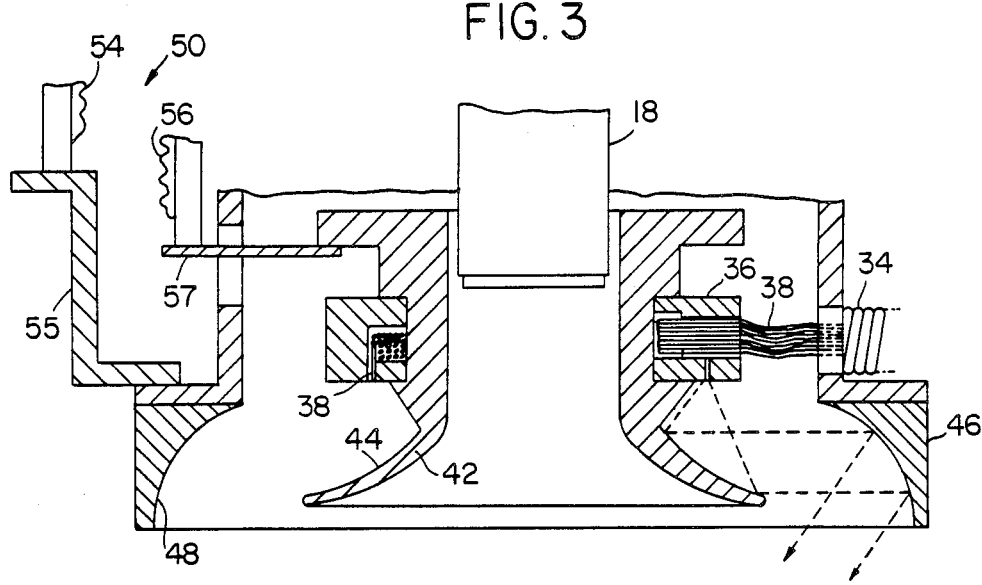
FIG. 3 is a side sectional view of a portion of the structure of FIG. 2.

The outwardly directed light pattern impinges on a second reflector ring 46 outside the first ring 42, and relatively movable with respect to it along the Z axis. The reflecting surface 48 of the second reflector ring 46 is of circular cross section, as seen in FIG. 3. A circular or spherical segment is adequate for present purposes, although a hyperbolic curve would be preferred where higher precision is needed. The position at which the substantially horizontal fan beam from the first reflector ring 42 impinges on the curved second reflector surface 48 determines the angle of deflection downward toward a focal point, thus acting as an angle generator. The parabolic reflector surface 44 substantially collimates the light from the optical fibers 38 that fans out toward the curved surface 48.

Figure 5:
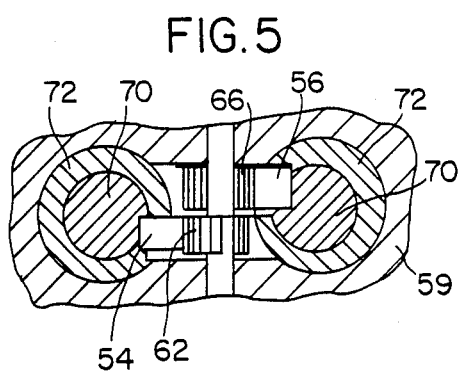
FIG. 5 is an end view of the structure of FIG. 4.
Figure 4:
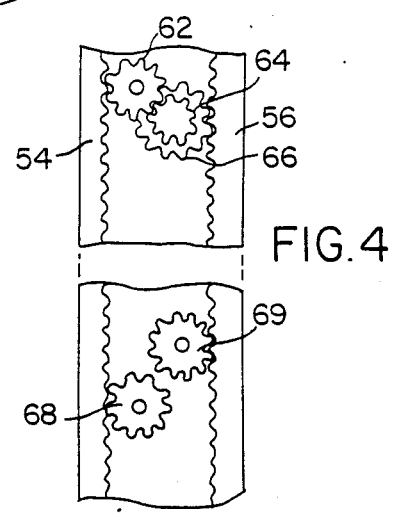
FIG. 4 is a fragmentary view of a portion of a differential drive mechanism used in the mechanism of FIGS. 2 and 3.

A differential drive mechanism 50, best seen in FIGS. 2, 3, 4 and 5, is mounted on the X axis carriage 22, and consequently is independent of the Z axis position of the camera 17 and lens system 18. A motor 52 (FIG. 2) independently drives the mechanism 50 so as to control the position of the second ring 46. The positions of both rings 42, 46 are changed concurrently in a certain proportionality which maintains focus as well as changing the angle of incidence. To this end, a pair of rack and pinion mechanisms are mounted in side-by-side relation, with a second rack 54 having a given tooth pitch being coupled to the second ring 46 by an angle bracket 55 and a first rack 56 having a greater pitch being coupled to the first ring 42 by an extending arm 57. The racks 54, 56 are offset in adjacent planes within an encompassing housing 59 attached to the Z axis support 19 (FIG. 1). Parallelism is maintained by drive and idler gears coupled within the housing at spaced apart regions between the racks 54, 56. The drive gears, as seen in FIGS. 4 and 5, include a first gear 62 coupled to the shaft of the motor 52 and engaging the second rack 54. The first gear 62 drives an adjacent second gear 64 in its plane, which is clustered with a third gear 66 in the plane of the first rack 56, and meshing with the teeth in the first rack 56. The first and third gears 62, 66 generate a differential movement determined by the ratio of the pitches of the two racks 54, 56, the gears 62, 66 having like diameters. Two idlers 68, 69 are arranged to engage the racks 54, 56 to maintain parallelism without bearings. With this arrangement, the racks 54, 56 reciprocate within the housing 59 and the needed motions are effected without the necessity for bearing supports. As seen in FIG. 5, the racks 54, 56 are attached to slider rods 70 which slide within bushings 72 in the housing.

In the operation of the system of FIG. 1, the sequence of operation for examination of a product 16 will typically commence with an operator controlling positioning of the Y axis stage 14 and the X axis carriage 22 to view different portions of the product 16, as these sequences and positions are stored in the processor memory. At each position focal planes are selected for the lens system 18 and camera 17 by positioning the Z axis support 19, and then a preferred angle of incidence is chosen for light from the illumination system 30. As the necessary set points for each position are sequentially selected by the operator, the sequence is stored in memory for that product 16. As each like product 16 is placed on the stage 14 in position for analysis, software for the system runs through the sequence in conventional fashion, focusing on and illuminating each selected point or region of the part. If the taper in the hole of the product 16 is to be measured, let it be assumed that the upper surface is a larger diameter and the lower surface is a smaller diameter. The camera 17 and lens 18 are then focused on one end or the other, and the illumination system 30 is shifted to give an optimum angle of incidence for a sharp transition in light contrast between the inner diameter of the hole and the surrounding background. Then the other end of the hole can be examined in similar fashion, with the focus end angle of incidence changed to show the transition most clearly.

Figure 6:
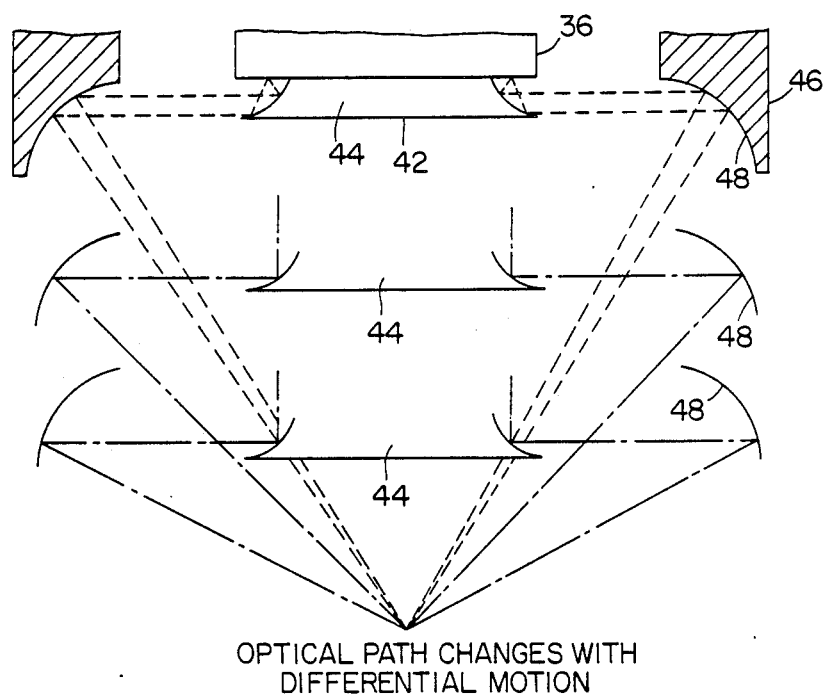
FIG. 6 is a simplified depiction of variations in the angle of incidence with different positions of the reflectors in the system of FIGS. 1-5.

As best seen in FIG. 6, the illuminating light from the ends of the optical fibers 38 in the light ring 36 provides a 360° closed sheath of light, but the light is somewhat divergent. Consequently, the parabolic first reflector surface 44 collects the light and substantially collimates it, directing it toward the second, angle generator surface 48, from whence it is directed toward a cone toward a focal point. As the angle of incidence is changed, the two reflector rings 42, 46 are moved together, but with a varying gap between them. Thus the light from the first, collector surface 44 impinges on a different region of the curved, angle generator surface 48, to change the angle of incidence but maintain the same focal point.

By controlling the remote light source 32 to illuminate different groups of the optical fibers 38, in quadrants around the light ring 36, the product 16 can be illuminated from different sides, as well as angles, improving the versatility of the system.

While there have been described and illustrated in the drawings, various forms and variations in accordance with the invention, it will be appreciated that the invention is not limited thereto but encompasses all exemplifications within the scope of the appended claims.

What is claimed is:

1. A system for illuminating a target object with focused light at varying angles of incidence relative to an optical axis and comprising:
   a ring light source concentric with the optical axis and providing a hollow cylinder of light directed toward the object;
   a first ring reflector having an outer surface of parabolic cross section in a path of the cylinder of light and reflecting the light into an outwardly disbursing pattern;
   a second ring reflector having an inner surface of curved cross section disposed about the first ring reflector and concentric therewith in a path of the pattern reflected from the first ring reflector; and
   means for varying the spacing of the first and second ring reflector from the object, including means for moving the second ring reflector differentially relative to the first.

2. The invention as set forth in claim 1 above, wherein the ring light source comprises a ring of fiber optic elements arranged in arc segments, and the system further includes means for separately energizing the arc segments of the ring.

3. The invention as set forth in claim 1 above, wherein the means for varying the spacing of the ring reflectors from the object comprises a pair of spaced apart racks having opposed teeth of different pitches, intercoupled gears disposed between the racks and engaging the teeth thereof, and motor means for driving the gears to provide differential movement of the racks, each rack being coupled to a different ring reflector.

4. The invention as set forth in claim 1 above, wherein the system further comprises an image camera directed along the optical axis and toward the object, and concentric with the rig light source and ring reflectors.

5. A method of examining an object with a vision system having an optical axis to enhance automatic recognition of distinctive features to be measured or identified automatically comprising the steps of:
   illuminating an object with a conical sheath of light concentric with the axis of the vision system and focused on a selected point relative to the object to be analyzed; and
   changing an angle of incidence of the conical sheath of light while maintaining it in focus at the selected point.

6. A method as set forth in claim 5 above, further comprising the steps of changing a selected region of the object to be analyzed, and concurrently changing the angle of incidence and a focal position of the conical sheath of light for best illumination.

7. An illumination system for use with a viewing system for inspecting, measuring or recording an image of an object at an optical axis, comprising:
   means providing a hollow cylindrical illuminating light pattern concentric with the optical axis and directed toward the object;
   a first ring element having a curved reflecting surface concentric with the optical axis and reflecting the cylindrical light in a first direction, a second ring element having a curved reflecting surface in a path of the light reflected from the first curved reflecting surface and reflecting the light into a conical illumination pattern; and
   means coupled to move the first and second ring elements along the optical axis with differential motion.

8. The invention as set forth in claim 7 above, wherein the reflecting surface of the first ring element has a paraboloidal curvature and the reflecting surface of the second ring element has a substantially circular curvature.

9. The invention as set forth in claim 8 above, wherein the means for moving the first and second ring elements along the optical axis comprises means for moving the second ring element at a rate which is greater than the movement of the first element, whereby the light reflected from the reflecting surface of the second ring element varies in angle of incidence but the focal point of the conical illumination pattern remains the same.

10. The invention as set forth in claim 9 above, wherein the means providing a light pattern comprises a plurality of optical fibers arranged in a circular pattern concentric with the optical axis and having their ends along parallel lines.

11. The invention as set forth in claim 9 above, wherein the reflecting surface of the first ring element is at a smaller diameter than the reflecting surface of the second ring element and wherein the means for moving the ring elements comprises a pair of parallel racks having facing teeth of different pitches and drive gear means disposed between the racks and engaging the teeth, and drive motor means coupled to the drive gear means.

12. A light system for providing light at variable angles of incidence on an object to be viewed at a focal plane along a viewing axis perpendicular to the viewing axis, comprising:
- a first body in the form of a surface of revolution concentric with the viewing axis and having an outer reflecting flange on a side opposite the focal plane, the reflecting flange defining a first reflecting surface that is parabolic in cross section;
- means disposed about the first body and providing a circular light source concentric with and directed onto the first reflecting surface, the light from the source diverging within a beam angle and the focal point of the first reflecting surface being selected to collimate light from the source;
- a second body in the form of a surface of revolution concentric with the viewing axis and having an inner reflecting flange on a side facing the focal plane, the reflecting flange defining a second reflecting surface that approximates a circular arc in cross section and reflects light inwardly toward the viewing axis;
- means coupled to the first and second bodies for moving such bodies along the viewing axis in a selected displacement ratio such that the light reflected from the second surface focuses at the focal plane.

13. A system as set forth in claim 12 above, wherein the first reflecting surface forms an outwardly directed sheet of light and the second reflecting surface is disposed outside the first reflecting surface.

14. A system as set forth in claim 13 above, wherein the light source comprises a plurality of optical fibers having fiber ends disposed in parallel to define a cylinder concentric about and parallel to the viewing axis.

15. A system as set forth in claim 14 above, wherein the light source further comprises means for energizing sets of the optical fibers to provide illumination of the object from different directions as well as from all directions about the object.

16. A vision system comprising:
- a stable base having a horizontal upper surface;
- a stable bridge spanning the upper surface in an X axis direction and overlying a viewing zone on the base;
- platform means on the upper surface of the base for receiving an object to be viewed, the platform means including Y axis drive means for providing horizontal movement in the Y direction;
- X axis carriage means mounted on the bridge and including X axis drive means for providing horizontal movement in the X direction;
- Z axis carriage means mounted on the X axis carriage means and including drive means for providing vertical movement;
- electronic camera means, including magnification means, mounted on the Z axis carriage means and oriented along an optical axis to view the viewing zone;
- illuminator means disposed concentrically about the electronic camera means and the optical axis for providing a cone of light on the object to be viewed, the illuminator means comprising a pair of ring reflectors; and
- illuminator drive means mounted on the Z axis carriage means and coupled to the illuminator means for moving the ring reflectors in a selected displacement ratio to maintain the cone of light in focus at different angles of incidence.

17. The invention as set forth in claim 16 above, wherein the system includes processor means coupled to control the X axis drive, Y axis drive, Z axis drive and illuminator drive means in a selected sequence of positions to focus the camera means on selected positions on the object and to concurrently illuminate the object with light at preferred angles of incidence.

18. The invention as set forth in claim 17 above, wherein the illuminator means comprises light source means providing a concentric light pattern about the viewing axis, and wherein the ring reflectors comprise a first, inner, reflector ring having a parabolic reflecting surface and a second, outer reflector ring having a generally circular reflecting surface, the parabolic reflecting surface collecting and collimating light from the concentric light pattern and the circular reflecting surface and its displacement along the optical axis relative to the parabolic reflecting surface establishing the angle of incidence of light directed toward the object.

* * * * *